No. 780,837. PATENTED JAN. 24, 1905.
L. S. SYDENSTRICKER.
WIRE STRETCHER.
APPLICATION FILED MAY 28, 1904.
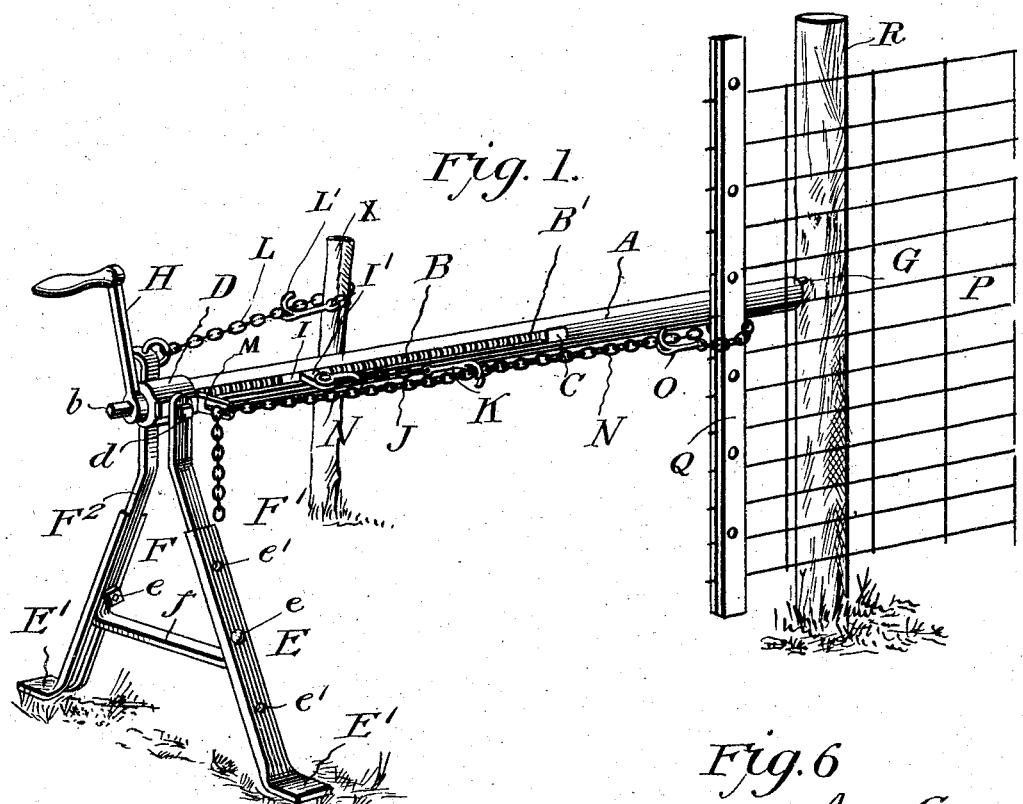
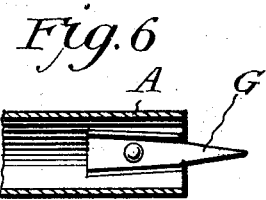
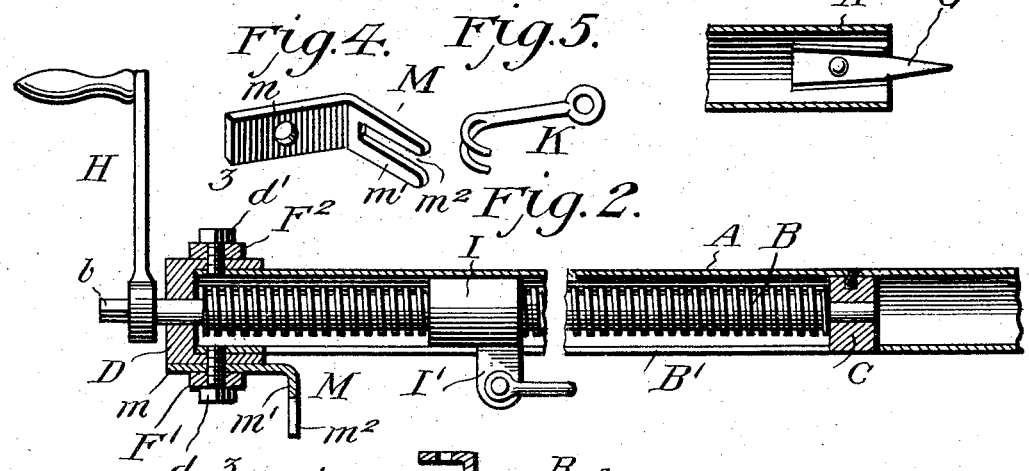
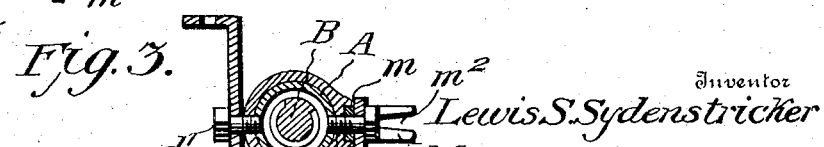
Inventor
Lewis S. Sydenstricker
Witnesses
Victor J. Evans
Attorney No. 780,837.  
Patented January 24, 1905.

UNITED STATES PATENT OFFICE.

LEWIS S. SYDENSTRICKER, OF HENLEYVILLE, CALIFORNIA.

WIRE-STRETCHER.

SPECIFICATION forming part of Letters Patent No. 780,837, dated January 24, 1905.

Application filed May 28, 1904. Serial No. 210,266.

*To all whom it may concern:*

Be it known that I, LEWIS S. SYDENSTRICKER, a citizen of the United States, residing at Henleyville, in the county of Tehama and State of California, have invented new and useful Improvements in Wire-Stretchers, of which the following is a specification.

This invention relates to a stretcher for tightening wire fences of any height, the construction being simple, compact, and portable, readily operated by one man, and capable of quick adjustment without detaching any of its parts, for stretching fences which lie on either side of the fence-posts. The device, which is operated by a screw, is suitably incased to protect the screw from contact with the ground and the hands and clothing from contact with the greasy screw.

In the accompanying drawings, Figure 1 is a perspective view of my improved wire-fence stretcher in its operative position. Fig. 2 is a horizontal sectional view of the outer or forward end of my invention. Fig. 3 is a view in cross-section on the line 3 3 of Fig. 2. Figs. 4, 5, and 6 are detail views.

Similar letters of reference indicate the same parts in all the figures.

Within a tubular casing A is journaled a screw B, its inner end turning in a block C, while a cap D, placed over the outer end of the casing A, serves as a bearing for the opposite end of said screw. When in an operative position, the tubular casing A is supported in a slightly-inclined position by means of adjustable legs E and a pointed finger G, riveted to the rear end of the casing A, driven into one of the fence-posts, as may be clearly seen in Fig. 1.

F represents a triangular-shaped frame having a horizontal side $f$ and upwardly-inclined sides $F'$ $F^2$, which before meeting are bent to a vertical position to embrace the cap D and are attached thereto by pivot-bolts $d$ $d'$. The side $F^2$ extends upwardly a short distance above the pivot-bolt $d'$, to which is fastened a holding-chain L, having on its end a grab-hook $L'$. The legs E are each channeled, as represented in Fig. 1, and fit over the sides of the frame F, to which they are secured by suitable bolts $e$. Holes $e'$ are made at different points in the length of the legs E for the bolts $e$ when it is desired to change the height of the tubular casing A to adjust it to fences of varying elevations. The lower ends of the legs E are turned outwardly to form broad flat feet $E'$, which give firmer and better support and will not sink into the ground under the weight of the stretcher nor the tension of the fence.

The journal $b$ of the screw B, which projects through the cap D, is squared and carries an operating-crank H for turning the screw B. Threaded on the screw B is a nut or traveler I with a projecting lug $I'$, that extends through a long slot $B'$, cut in one side of the tubular casing A. To the lug $I'$ a short length of chain J, ending in a grab-hook K, is attached. A chain-holder M is secured to the cap D in the manner indicated in Fig. 2. As there shown, that side of the cap to which the inclined part $F'$ of the triangular frame F is pivoted is slotted for the reception of the portion $m$ of the chain-holder and held against displacement by the pivot-bolt $d$. The other portion $m'$ of the chain-holder is bent at an angle to the part $m$ and has formed therein a slot $m^2$.

N indicates a chain supported in the slot of the chain-holder, its rear end being supplied with a hook O, similar to the grab-hooks K and $L'$. The fence to be stretched is indicated by P, the fence-holding clamp by Q, around the longitudinal center of which the chain N is wrapped and fastened by means of the hook O engaging one of the links of the chain, and the fence-post by R.

When setting up my device for stretching a fence, the legs E are adjusted to bring the pivot-screws $d$ $d'$ about on a line with the center of the fence from top to bottom. This may be readily done by removing the bolts $e$ and sliding the legs up or down on the frame F until the proper height is reached, when the bolts are reinserted. It will thus be seen that whatever the height of the fence a direct pull from its center can always be obtained. The feet $E'$ are placed on the ground and the pointed finger G driven in a fence-post R, so that that end will be about two inches higher than the opposite end. A post X is driven in the ground on the side of the device opposite the chain end, around which the holding-chain L is drawn taut and fastened by means of the grab-hook L' engaging one of the links of the chain. The object of this arrangement is to prevent the casing A from being drawn or pulled out of line while the fence is being stretched. The longitudinal wires of the fence P are firmly affixed to the clamp Q, around the center of which the chain L is fastened, as previously described, and the chain tightened and secured to the chain-holder M. The screw B is now turned in the proper direction by the crank H until the nut or traveler I has reached the bearing-block C. The short chain J is then attached by means of its grab-hook K to the chain N, as shown in Fig. 1. If the crank H be now turned in opposite direction, the nut I will move forward, drawing the fence with it. After the nut has traveled as far as possible without tightening the fence sufficiently the chain N will be disengaged from the holder M, the slack taken up, and the chain again connected to the holder to retain the fence in the position to which it has been drawn. The crank H is now turned in reverse direction and the nut run back, the hook K being disengaged meanwhile from chain N and again connected thereto after the nut has reached its rearmost position. The handle is once more manipulated until the proper tension has been given the fence, which is then fastened to the post. If necessary, this operation will be repeated until the fence has been properly stretched.

With my device it is immaterial on which side of the fence-post the fence is to be fastened. All that is required to change the position of the operative parts to the side opposite that shown in Fig. 1 is to turn the tubular casing A on the pivot-bolts $d$ $d'$. This movement will change the positions of the several parts from that shown to the opposite side.

It will be observed that the operating-screw B is inclosed in a casing A, which protects the hands and clothing of the operator from contact with the greasy screw and the screw from grit and dirt when the device is placed on the ground.

Having thus fully described the invention, what is claimed as new is—

1. In a fence-stretcher, the combination of a rotatable screw suitably supported at each end, a nut or traveler on said screw adapted to operate holding devices, and legs pivoted to each side of the support at one end of said screw, whereby the screw may be inverted.

2. In a fence-stretcher, the combination of a rotatable screw, a tubular casing inclosing said screw with bearings therein for said screw, a nut or traveler on said screw, means connected with the nut or traveler for operating holding devices, and supporting-legs pivoted to each side of the tubular casing at one end, whereby the casing may be inverted.

3. In a fence-stretcher, a rotatable screw, supports for each end, and a nut or traveler on said screw adapted to operate stretching devices, combined with legs pivoted to one of said supports in such manner that the position of the screw with respect to the legs may be changed by inverting one or the other.

4. In a fence-stretcher, the combination of a rotatable screw, supports at each end thereof, a nut or traveler on said screw adapted to operate stretching devices, and vertically-adjustable legs pivoted to one of the screw-supports.

5. In a fence-stretcher, the combination of a rotatable screw, a tubular casing with bearings for said screw, a nut or traveler on said screw, means on the nut or traveler for operating a drawing-chain, a pointed finger on one end of said tubular support, and adjustable supporting-legs pivoted to the opposite end of said tubular support.

6. In a fence-stretcher, the combination of a rotatable screw, a tubular casing therefor, bearing for the rotatable screw attached to the casing, a nut or traveler threaded on the screw and having a lug projecting through a longitudinal slot in said tubular casing, and a connecting-chain and hook attached to said lug.

In testimony whereof I affix my signature in presence of two witnesses.

LEWIS S. SYDENSTRICKER.

Witnesses:
CHAS. KAUFMAN,
F. M. CRAIG.